US009027432B2

(12) United States Patent
Takano et al.

(10) Patent No.: US 9,027,432 B2
(45) Date of Patent: May 12, 2015

(54) ELECTRIC STEERING LOCK DEVICE

(71) Applicant: Alpha Corporation, Yokohama-shi, Kanagawa (JP)

(72) Inventors: Yoshitaka Takano, Yokohama (JP); Takahiro Okada, Yokohama (JP)

(73) Assignee: Alpha Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 14/376,858

(22) PCT Filed: Feb. 28, 2013

(86) PCT No.: PCT/JP2013/055326
§ 371 (c)(1),
(2) Date: Aug. 6, 2014

(87) PCT Pub. No.: WO2013/129546
PCT Pub. Date: Sep. 6, 2013

(65) Prior Publication Data
US 2014/0373664 A1 Dec. 25, 2014

(30) Foreign Application Priority Data

Mar. 1, 2012 (JP) ................. 2012-045254

(51) Int. Cl.
*B60R 25/0215* (2013.01)
*B62D 1/16* (2006.01)
*B62D 1/184* (2006.01)
*B62D 1/18* (2006.01)

(52) U.S. Cl.
CPC .............. *B62D 1/18* (2013.01); *B60R 25/0215* (2013.01); *B62D 1/16* (2013.01)

(58) Field of Classification Search
CPC ............ B62D 1/16; B62D 1/18; B62D 1/184; B60R 25/0215; B60R 25/02153; B60R 25/02156
USPC ....................... 70/182, 183, 184, 252; 74/495
See application file for complete search history.

(56) References Cited

U.S. PATENT DOCUMENTS 6,125,671 A * 10/2000 Suzuki ........................... 70/186
6,324,878 B1 * 12/2001 Ramamurthy et al. ......... 70/186
7,086,256 B2 * 8/2006 Hasegawa ...................... 70/186
(Continued)

FOREIGN PATENT DOCUMENTS

JP        2002283957 A    10/2002
WO      2011148712 A1    12/2011

OTHER PUBLICATIONS

Written Opinion dated Mar. 26, 2013 corresponding to International application No. PCT/JP2013/055326.
(Continued)

*Primary Examiner* — Paul N Dickson
*Assistant Examiner* — Laura Freedman
(74) *Attorney, Agent, or Firm* — Nath, Goldberg & Meyer; Jerald L. Meyer

(57) ABSTRACT

A motor cover (80) includes an edge portion (84) located outside an inner side surface of a frame cover (20) with the motor cover (80) being disposed inside a housing chamber (12), configured to push the frame cover (20) wider when the frame cover (20) is mounted onto a frame (10), and configured to be pressed by the frame cover (20) from an opened surface of the frame (10) with the frame cover (20) being mounted on the frame (10).

5 Claims, 5 Drawing Sheets

(56) References Cited

U.S. PATENT DOCUMENTS

| | | | |
|---|---|---|---|
| 7,870,768 B2* | 1/2011 | Tanioka et al. | 70/186 |
| 7,891,221 B2* | 2/2011 | Sugimoto | 70/186 |
| 8,240,176 B2* | 8/2012 | Okada | 70/182 |
| 8,256,252 B2* | 9/2012 | Okada | 70/182 |
| 8,833,119 B2* | 9/2014 | Noma | 70/186 |
| 8,925,415 B2* | 1/2015 | Okada et al. | 74/495 |
| 8,925,416 B2* | 1/2015 | Okada et al. | 74/495 |
| 2006/0053921 A1* | 3/2006 | Kawamura et al. | 74/425 |
| 2013/0055846 A1* | 3/2013 | Sugimoto et al. | 74/495 |

OTHER PUBLICATIONS

Search Report dated May 10, 2011 corresponding to International application No. PCT/JP2011/057791.

International Application No. PCT/JP2013/055326, International Preliminary Report on Patentability dated Sep. 12, 2014, six (6) pages.

* cited by examiner

Prior Art

ELECTRIC STEERING LOCK DEVICE

TECHNICAL FIELD

The present invention relates to an electric steering lock device configured to lock the turn of a steering shaft of an automobile.

BACKGROUND ART

What is disclosed in PTL 1 has been known as a related electric steering lock device. FIG. 1 shows a configuration of the electric steering lock device described in PTL 1. The electric steering lock device 101 includes: a lock member 160 configured to prohibit the turn of a steering shaft (not illustrated); an electric motor 130 serving as a driving source; and transmission means 140 for transmitting driving force of the electric motor 130 to the lock member while converting rotary motion of the electric motor 130 into linear motion.

The lock member 160 is arranged movably between a locking position at which a tip end of the lock member 160 juts out from a frame 110 and an unlocking position at which the lock member 160 is housed in the frame 110.

The transmission means 140 is formed from: a worm gear 141 placed around a drive shaft 130a of the electric motor 130; a disk-shaped worm wheel 142; a slide gear 145 provided around a center shaft 142a of the worm wheel 142; and a slide nut 146 in threaded engagement with the slide gear 145. The transmission means 140 together with the electric motor 130 is housed in a motor case 185. In the housed state, the transmission means 140 is installed in a housing chamber 112 formed inside the frame 110. An opening of the housing chamber 112 is sealed with a cover 120.

Once the electric motor 130 drives, the rotations of the drive shaft 130a are transmitted to the worm wheel 142 via the worm gear 141, and the worm wheel 142 rotates with the slide gear 145. Once the slide gear 145 rotates, the slide nut 146 moves in an axial direction of the center shaft 142a, and the lock member 160 moves with the slide nut 146.

CITATION LIST

Patent Literature

PTL 1: Japanese Unexamined Patent Application Publication No. 2002-283957

SUMMARY OF INVENTION

The related electric steering lock device 101 described above, however, has the following problem since the center shaft 142a of the worm wheel 142 is pivotally supported by the motor case 185. Heavy load application, such as the driving of the electric motor 130 in a condition which does not allow the worm wheel 142 to rotate, is more likely to tilt the worm wheel 142, to deform the motor case 185, and accordingly to result in insufficient holding of the electric motor 130.

An object of the present invention is to provide an electric steering lock device which is capable of keeping a motor securely fixed inside a housing chamber even in a case of heavy load application without increasing the number of parts.

An electric steering lock device in accordance with some embodiments includes: a frame having a shape of box with an opened surface and having a housing chamber formed inside the frame; a motor disposed inside the housing chamber, including a driving shaft, and configured to serve as a driving source; a worm gear fixed to the driving shaft of the motor; a worm wheel having a shape of disk, having a center shaft with one end pivotally supported by a bottom portion of the housing chamber, and disposed to be meshable with the worm gear; a motor cover configured to pivotally support the other end of the center shaft of the worm wheel and disposed inside the housing chamber while in contact with the motor; and a frame cover having a shape of box with an opened surface and mounted on the frame and seal an opening of the housing chamber. The motor cover includes an edge portion located outside an inner side surface of the frame cover with the motor cover being disposed inside the housing chamber, configured to push the frame cover wider when the frame cover is mounted onto the frame, and configured to be pressed by the frame cover from the opened surface of the frame with the frame cover being mounted on the frame.

In the foregoing configuration, the motor cover is designed in a way that, in the state where the motor cover is installed inside the housing chamber, the edge portion of the motor cover is located outside the inner side surface of the frame cover. In addition, the motor cover is designed in a way that, when the frame cover is mounted onto the frame, the edge portion of the motor cover pushes the frame cover wider, and the frame cover presses the edge portion of the motor cover from the opened surface of the frame. Thereby, the motor cover can be fixed to the inside of the housing chamber without increasing the number of parts or complicating the work process. For this reason, even when excessive load is applied to the worm wheel, the motor can be fixed to the inside of the housing chamber.

The frame may include a side wall forming an opening edge of the frame and including a slit-shaped groove, and the edge portion of the motor cover may include a rib configured to penetrate through the groove from the housing chamber and project to an outside of the frame with the motor cover being installed inside the housing chamber, the rib being configured to push the frame cover wider when the frame cover is mounted onto the frame.

In the foregoing configuration, the slit-shaped groove is provided to the side wall of the frame; the rib is provided to the edge portion of the motor cover; and the rib is designed to push the frame cover wider when the frame cover is mounted onto the frame. Thereby, the motor cover can be easily positioned without increasing the number of parts.

The frame cover may include a recessed groove in a region in an inner surface of the frame cover opposed to the rib, the recessed groove being capable of housing a tip end portion of the rib.

In the foregoing configuration, when the frame cover is mounted onto the frame, the rib pushes the frame cover wider while housing the tip end portion of the rib into the recessed groove. Thereby, the frame cover can be designed in a way that: the rib comes into close contact with the recessed groove; and a step formed in an edge of the recessed groove comes into engagement with the tip end portion of the rib. In addition, the frame cover is fixed to the frame in the state where the frame cover is pushed wider by the rib. For these reasons, it is possible to suppress vibrations caused by the operation of the motor, and to prevent the occurrence of rattling noises from the frame cover.

The rib and the groove may be disposed on an extension line from the driving shaft of the motor with the motor cover being disposed inside the housing chamber.

In the foregoing configuration, the rib and the groove are disposed on the extension line from the driving shaft of the motor. Thereby, it is possible to suppress force with which the motor would be otherwise lifted from the housing chamber because of driving reaction force, and to securely fix the motor to the inside of the housing chamber.

DESCRIPTION OF EMBODIMENTS

Figure 1:
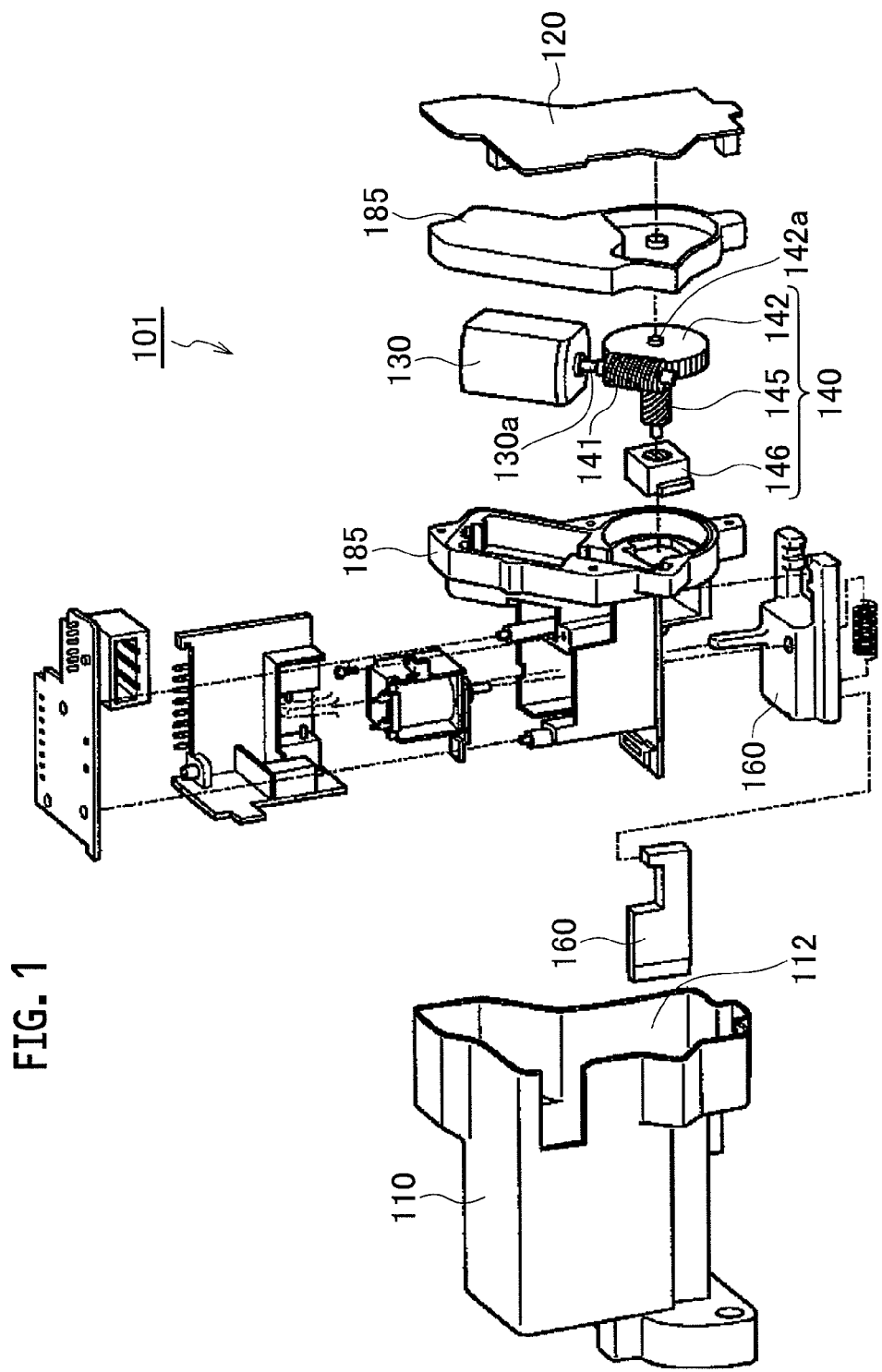
FIG. 1 is a schematic diagram showing a related electric steering lock device.

Descriptions will be hereinbelow provided for an embodiment of the present invention on the basis of the drawings. As an electric steering lock device 1, an electric steering lock device of the embodiment is attached to a steering column device (not illustrated) configured to house a steering shaft (not illustrated) of an automobile. As shown in FIGS. 2 to 6, the electric steering lock device 1 is formed mainly from a frame 10, a frame cover 20, an electric motor 30, transmission means 40, a slide member 50, a lock member 60 and a control board 70.

The frame 10 includes a pair of leg portions 11 arranged over the steering column device. The frame 10 is shaped like a box, one (an upper surface in FIG. 2 and the like) of whose surfaces is opened. The frame 10 is covered with the frame cover 20 configured to cover the opening of the frame 10. Thereby, a housing chamber 12 in which a housing space is formed is provided inside the frame 10.

The housing chamber 12 houses: the electric motor 30 serving as a driving source; the transmission means 40 for transmitting driving force of the electric motor 30 to the slide member 50, which will be described later; the slide member 50 configured to slide in a direction perpendicular to the lock member 60, which will be described later, by being driven via the transmission means 40; the lock member 60 whose tip end is fittable into the steering shaft by projecting from and retracting into a bottom surface of the frame 10; and the control board 70 configured to control operation of the electric motor 30.

Then, in a locking state, the lock member 60 projects from the frame 10, as well as a tip end portion 62a of the lock member 60 engages with a circumferential surface of the steering shaft, and thereby restricts the turn of the steering shaft. Meanwhile, in an unlocking state, the lock member 60 is housed into the frame 10, and thereby allows the turn of the steering shaft since the lock member 60 becomes separated from the steering shaft.

The frame 10 has a frame-side wheel bearing portion 13 in a bottom portion of the housing chamber 12, and the frame-side wheel bearing portion 13 is formed from a circular recessed portion. An end of a center shaft 42a of a worm wheel 42, which will be described later, is rotatably arranged in the frame-side wheel bearing portion 13. A motor bearing portion 14 in which the electric motor 30 is arranged is provided in the vicinity of the frame-side wheel bearing portion 13 in the housing chamber 12. A side wall 15 forming an opening edge of the frame 10 is provided with a slit-shaped groove 16 which is formed in a height direction of the side wall 15, and whose opening edge-side tip portion is opened. The frame 10 further includes a through-hole 17 which extends in a direction perpendicular to an axial direction of the steering shaft, and which penetrates through the frame 10 from the bottom portion of the housing chamber 12 to the interstice between the pair of leg portions 11. The lock member 60 formed from a hanger member 61 and a lock body 62 is inserted into the through-hole 17.

The frame cover 20 is shaped like a box, one (an undersurface in FIG. 2 and the like) of whose surfaces is opened. The frame cover 20 is fixed to the frame 10 by engaging lock portions 21, which are provided in the opening edge, with lock receiving portions 18 which are provided on a peripheral edge of the housing chamber 12 of the frame 10. A recessed groove 22 is formed in an inner surface of the frame cover 20, which is opposed to the groove 16.

The electric motor 30 is fixed to the motor bearing portion 14 in the frame 10 by being covered with a motor cover 80, which will be described later.

The transmission means 40 is formed from a worm gear 41 and the worm wheel 42. The worm gear 41 is attached to a driving shaft 30a of the electric motor 30, and rotates with the driving shaft 30a.

Figure 2:
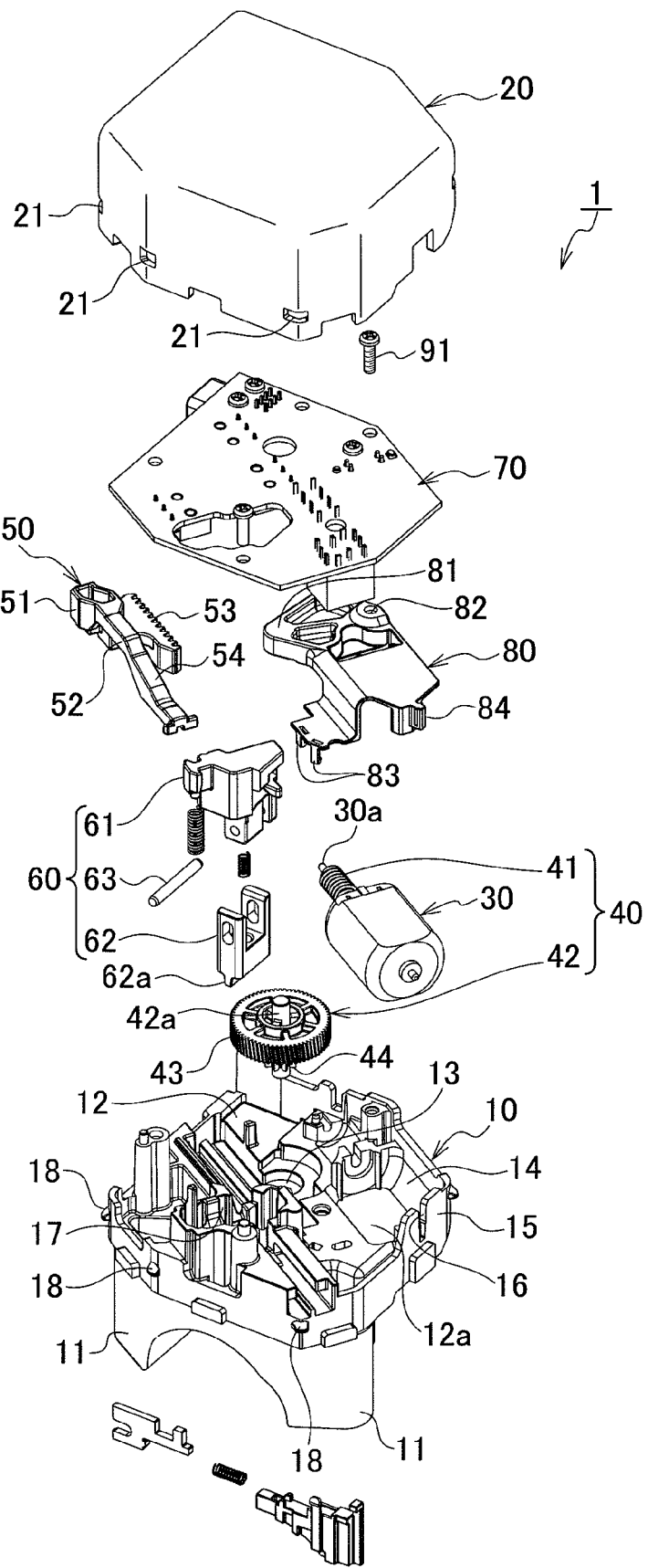
FIG. 2 is an exploded perspective view showing an electric steering lock device of an embodiment of the present invention.
Figure 3:
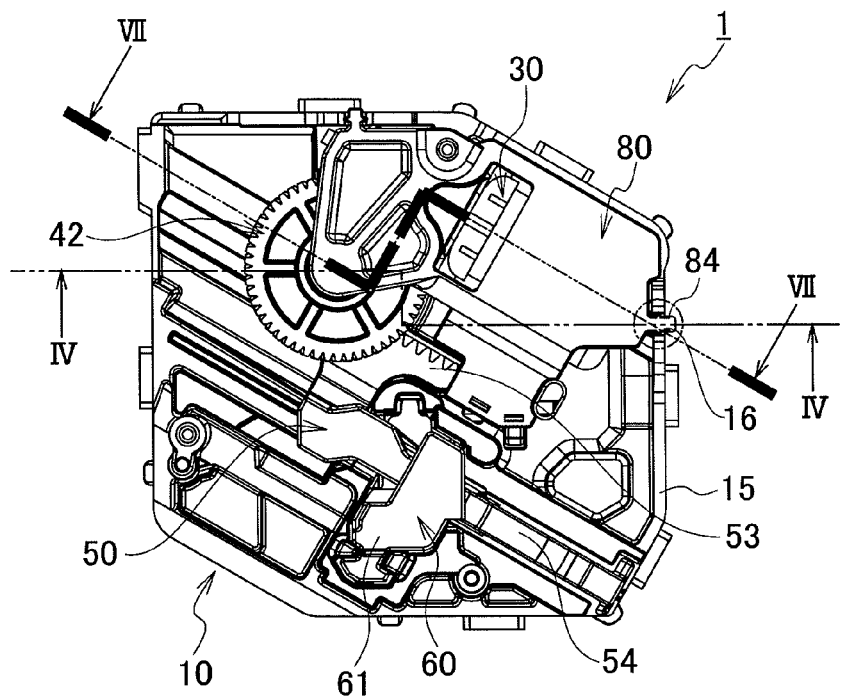
FIG. 3 is a plan view showing an unlocking state of the electric steering lock device of the embodiment of the present invention, excluding a cover and a control board.
Figure 4:
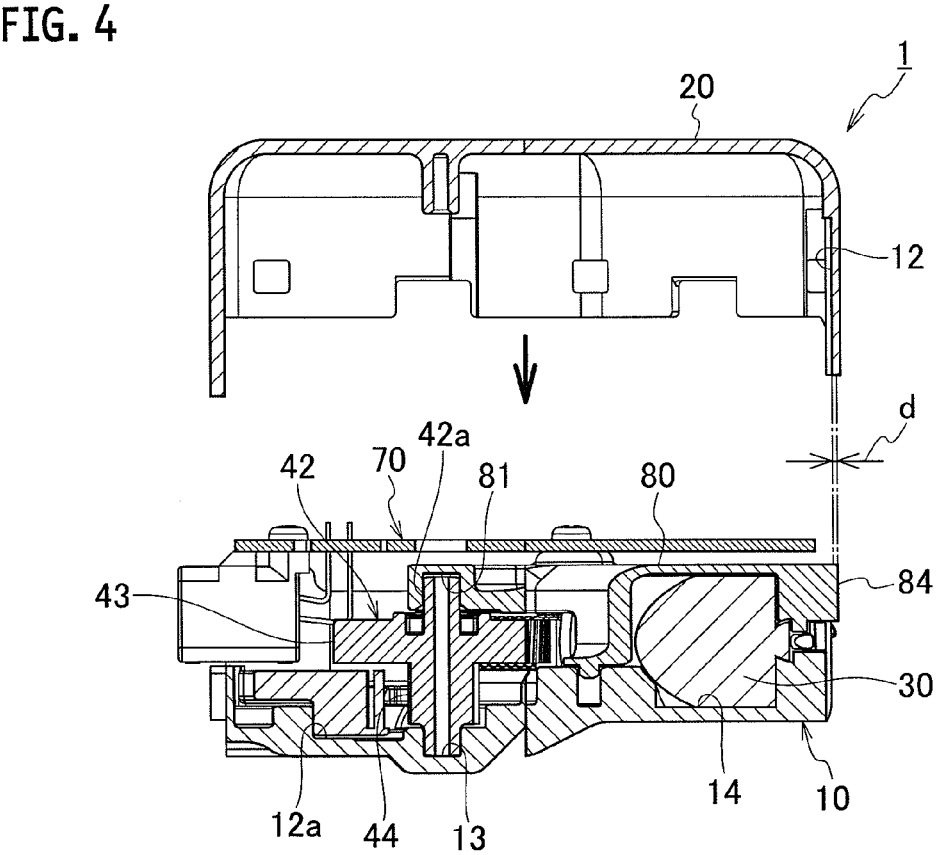
FIG. 4 is a cross-sectional view of the electric steering lock device of the embodiment of the present invention before the cover is mounted onto it, taken along the IV-IV line of FIG. 3.

As shown in FIGS. 2 and 4, the worm wheel 42 is formed from a large-diameter gear portion 43, a small-diameter gear portion 44, and the center shaft 42a. The large-diameter gear portion 43 is a gear shaped almost like a disk, and including teeth provided on its circumferential surface. The large-diameter gear portion 43 is configured to be capable of meshing with the worm gear 41. In the worm wheel 42, the small-diameter gear portion 44 and the large-diameter gear portion 43 are integrally adjacent to each other. The small-diameter gear portion 44 is a gear shaped almost like a disk, whose diameter is smaller than that of the large-diameter gear portion 43. Teeth set capable of meshing with a rack portion 53 in the slide member 50 are provided on the circumferential surface of the small-diameter gear portion 44. The large-diameter gear portion 43 and the small-diameter gear portion 44 are provided in a way that their centers coincide with each other, and the center shaft 42a is set in their centers. Together with the electric motor 30, the worm wheel 42 is housed into the housing chamber 12 with the large-diameter gear portion 43 in mesh with the worm gear 41, with the small-diameter gear portion 44 in mesh with the rack portion 53 in the slide member 50 which will be described later, and with one end of the center shaft 42a pivotally supported by the frame-side wheel bearing portion 13. The electric motor 30 and the transmission means 40 housed in the housing chamber 12 are covered with the motor cover 80 from the opening surface side of the housing chamber 12. By this, the electric motor 30 is fixed to the inside of the housing chamber 12, while the other end of the center shaft 42a of the worm wheel 42 is pivotally supported by a cover-side wheel bearing portion 81 of the motor cover 80.

As shown in FIG. 2, the motor cover 80 includes: a fixing hole 82 formed from a through-hole arranged in the vicinity of the cover-side wheel bearing portion 81; locking claws 83 each formed from a hook claw; and a rib 84 extending from an edge portion of the motor cover 80. Furthermore, the motor cover 80 is fixed to the housing chamber 12 with a fixing screw 91 penetrating through the fixing hole 82 and the control board 70 which will be described later, and threadedly engaging with the bottom portion 12*a* of the housing chamber 12. In addition, the motor cover 80 is fixed to the housing chamber 12 with the locking claws 83 engaging with an engagement hole (not illustrated) which is formed in the bottom portion of the housing chamber 12.

Figure 5:
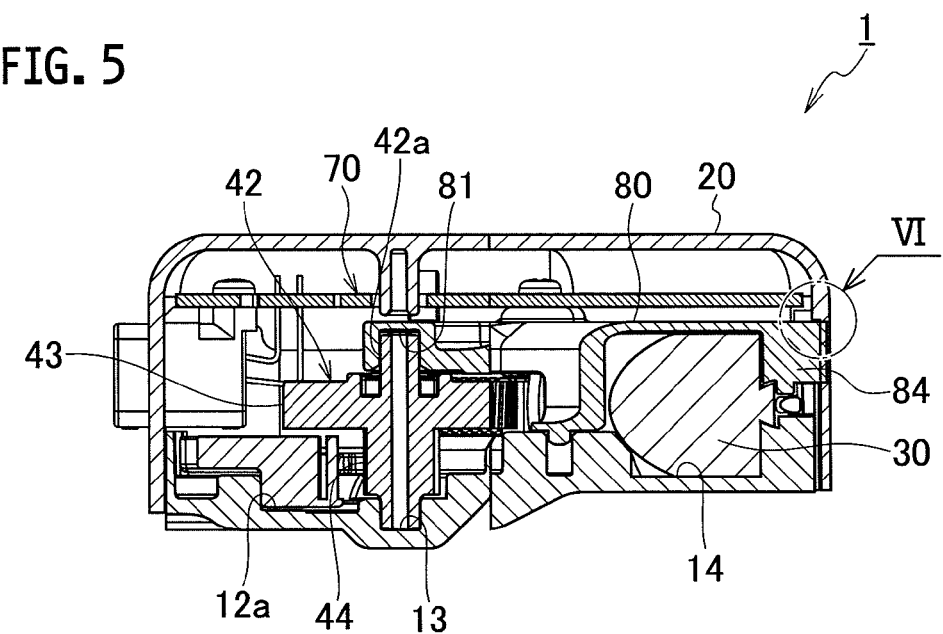
FIG. 5 is a cross-sectional view of the electric steering lock device of the embodiment of the present invention after the cover is mounted onto it, taken along the IV-IV line of FIG. 3.
Figure 6:
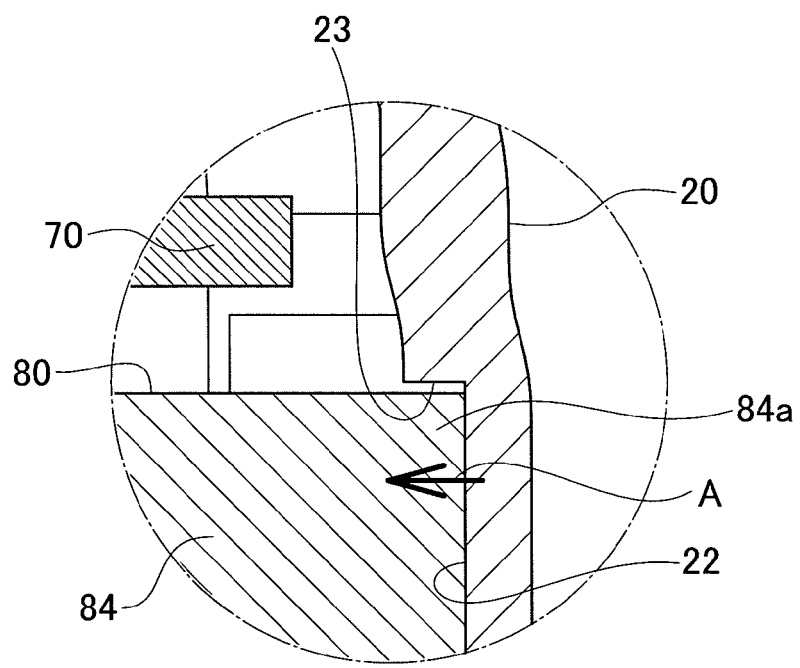
FIG. 6 is a main part magnified view of a VI part in FIG. 5.

The rib 84 is extendingly provided to the edge portion of the motor cover 80, which is in contact with the side wall 15 of the frame 10 as shown in FIGS. 4 to 6, in a way that the rib 84 is located on an extension line from the driving shaft 30*a* of the electric motor 30, penetrates through the groove 16 from the housing chamber 12 side, and projects to the outside of the frame 10. As for the dimension of the rib 84, an amount d of the projection is set in a way that a tip end of the rib 84 is located outside the recessed groove 22 provided in the inner surface of the frame cover 20 when the motor cover 80 is installed in the housing chamber 12. Furthermore, when the frame cover 20 is mounted onto the frame 10, the rib 84 pushes the frame cover 20 wider while a tip end portion 84*a* of the rib 84 becomes housed in the recessed groove 22. Thereby, the recessed groove 22 comes into close contact with the rib 84 in a direction indicated with an arrow A, and a step 23 formed in an edge of the recessed groove 22 comes into engagement with the tip end portion 84*a* of the rib 84.

As shown in FIG. 2, the slide member 50 is formed from: a base portion 51; an arm portion 52 projecting from one end of the base portion 51 in a slide direction of the slide member 50; and the rack portion 53 provided to another end of the base portion 51, extending in the slide direction, and being in mesh with the small-diameter gear portion 44. It should be noted that the slide direction of the slide member 50 is set as a direction extending along the bottom portion 12*a* of the housing chamber 12, and being perpendicular to the lock member 60. The arm portion 52 includes a displacement portion 54 which becomes gradually inclined toward the steering shaft from a direction pointing to a tip end portion of the arm portion 52 from a base portion 51-side root portion of the arm portion 52. For this reason, when the slide member 50 slides, the lock member 60 moves along an inclined surface of the displacement portion 54. Thereby, the lock member 60 is displaced between a locking position where the lock member 60 blocks the turn of the steering shaft and an unlocking position where the lock member 60 allows the turn of the steering shaft.

The lock member 60 is formed from: the hanger member 61 in engagement with the slide member 50; and the lock body 62 which is connected to the hanger member 61, and whose tip end is fittable into the steering shaft by projecting from and retracting into the bottom surface of the frame 10.

The control board 70 is provided with multiple detection switches (not illustrated) which are operable depending on slide motions of the slide member 50 in away that the detection switches are located along a side surface of the slide member 50. A lock detection switch constituting one of the detection switches is activated when it comes into contact with the slide member 50 that moves to the locking position, and thereby detects that the lock body 62 is in the locking position where the lock body 62 projects from the frame 10. On the other hand, an unlock detection switch constituting the other of the detection switches is activated when it comes into contact with the slide member 50 that moves to the unlocking position, and thereby detects that the lock body 62 is in the unlocking position where the lock body 62 is housed in the frame 10.

Next, descriptions will be provided for procedures for assembling the electric steering lock device 1. First of all, the lock member 60 is assembled by connecting the hanger member 61 and the lock body 62 by use of a connection pin 63. Then, an assemblage is assembled by connecting the hanger member 61 and the slide member 50. The slide member 50 is arranged at a predetermined position inside the housing chamber 12 while inserting the lock member 60 into the through-hole 17 in the frame 10.

Subsequently, the worm gear 41 is mounted onto the driving shaft 30*a* of the electric motor 30. The electric motor 30 is arranged into the motor bearing portion 14. Thereafter, the end of the center shaft 42*a* of the worm wheel 42 is arranged into the frame-side wheel bearing portion 13 while bringing the large-diameter gear portion 43 of the worm wheel 42 into mesh with the worm gear 41, and while bringing the small-diameter gear portion 44 of the worm wheel 42 into mesh with the rack portion 53.

Subsequently, each locking claw 83 is locked into the engagement hole while inserting the rib 84 of the motor cover 80 into the groove 16. Thereafter, wiring is laid out with the control board 70 stacked onto the motor cover 80. Then, the control board 70 and the motor cover 80 are fixed to the housing chamber 12 by use of the fixing screw 91 (see FIG. 4).

After that, as shown in FIGS. 5 and 6, the frame cover 20 is mounted onto the frame 10, and the lock portions 21 of the frame cover 20 are brought into engagement with the lock receiving portions 18 in the frame 10 with the frame cover 20 pushed wider by the rib 84.

Next, descriptions will be provided for how the electric steering lock device 1 works. When establishing the locking state, the hanger member 61 comes into engagement with the tip end portion of the arm portion 52 of the slide member 50, and the tip end of the lock member 60 projects from the frame 10. On the other hand, when establishing the unlocking state, the hanger member 61 comes into engagement with a base end portion of the arm portion 52 of the slide member 50, and the tip end of the lock member 60 is housed into the frame 10. Furthermore, the forward and reverse rotations of the electric motor 30 change the rotational directions of the worm wheel 42, and the slide member 50 accordingly moves backward and forward. In response to the backward and forward movements of the slide member 50, the hanger member 61 slides the arm portion 52 of the slide member 50, and the tip end of the lock member 62 projects from and retracts into the frame 10.

During the unlocking operation, however, there is a case where the tip end of the lock body 62 is caught between the steering shaft and the frame 10, and cannot therefore be pulled out easily. In such a case, the slide member 50 linked with the hanger member 61 cannot slide until the lock body 62 is pulled out. As a result, the driving force of the electric motor 30 is continuously applied to the worm wheel 42 while the worm wheel 42 in mesh with the rack portion 53 remains unable to rotate.

Figure 7:
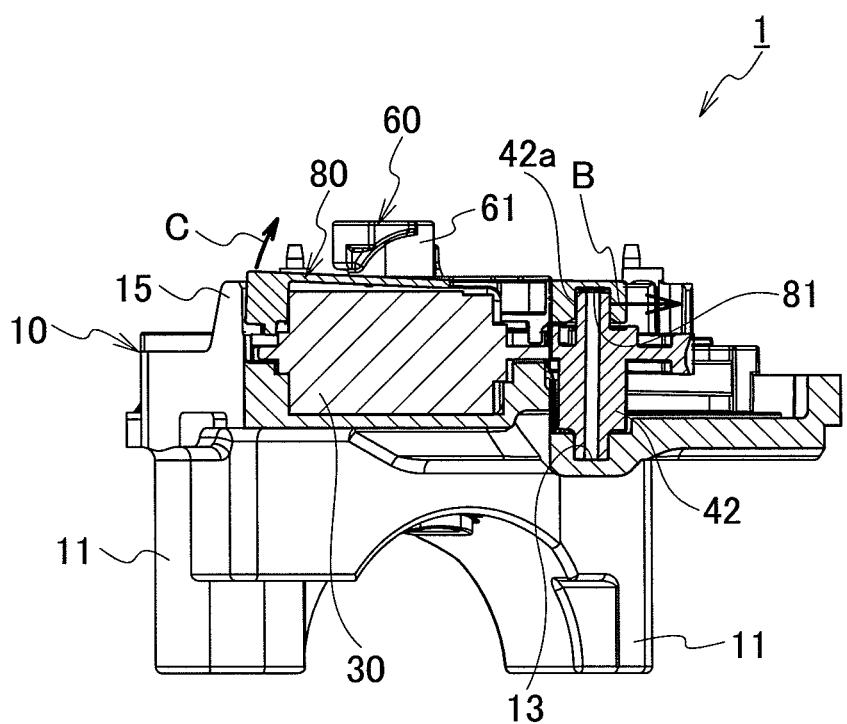
FIG. 7 is a cross-sectional view taken along the VII-VII line of FIG. 3, showing a state of application of excessive load from an electric motor to a worm wheel.

As shown in FIG. 7, the worm wheel 42 is pivotally supported by the frame-side wheel bearing portion 13 and the cover-side wheel bearing portion 81 with the large-diameter gear portion 43 located closer to the motor cover 80 than the small-diameter gear portion 44 is. For this reason, if the driving force of the electric motor 30 is continuously applied to the worm wheel 42 while the worm wheel 42 remains unable to rotate due to the rack portion 53 in mesh, the driving force of the electric motor 30 is converted into force which falls in a direction indicated with an arrow B, and is thus applied to the worm wheel 42.

As a consequence, the motor cover 80 is pulled in the direction indicated with the arrow B because the motor cover 80 is weaker in mechanical strength than the frame-side wheel bearing portion 13 of the frame 10. Accordingly, an opposite portion (a right portion in FIG. 7) of the motor cover 80 from the cover-side wheel bearing portion 81 moves away from the electric motor 30, and is flexurally deformed in an uplift direction (a direction indicated with an arrow C).

The motor cover 80 suppresses driving reaction force of the electric motor 30 by being arranged in contact with the electric motor 30, which is arranged in the motor bearing portion 14, from the opening side of the frame 10 (from above in FIG. 7). However, once the motor cover 80 moves away and is lifted from the electric motor 30, the electric motor 30 is lifted from the motor bearing portion 14 due to the driving reaction force. Accordingly, the electric motor 30 is likely to be held insufficiently.

In contrast, in the embodiment, the rib 84 pushes the frame cover 20 wider while housing the tip end portion 84a of the rib 84 of the motor cover 80 into the recessed groove 22 in the frame cover 20. Thereby, the rib 84 comes into close contact with the recessed groove 22, and the step 23 formed in the edge of the recessed groove 22 comes into engagement with the tip end portion 84a of the rib 84. For this reason, even in a case where the motor cover 80 would be otherwise deformed because of the application of excessive load, the motor cover 80 is not lifted from the electric motor 30, whereby the electric motor 30 is kept from being held insufficiently.

As described above, the embodiment of the present invention employs the configuration in which: the dimensions are set in a way that the rib 84 of the motor cover 80 projects to the outside of the frame 10 with the motor cover 80 installed in the housing chamber 12; and when the frame cover 20 is mounted onto the frame 10, the rib 84 pushes the frame cover 20 wider, and the frame cover 20 presses the rib 84 from the opening surface side of the frame 10. This makes it possible to fix the motor cover to the inside of the housing chamber without increasing the number of parts or complicating the work process, and to securely fix the electric motor 30 to the inside of the housing chamber even when excessive load is applied to the worm wheel.

The embodiment of the present invention further employs the configuration in which: the slit-shaped groove 16 is provided to the side wall 15 of the frame 10; the rib 84 is extendingly provided to the edge portion of the motor cover 80; and when the frame cover 20 is mounted onto the frame 10, the rib 84 pushes the frame cover 20 wider. This makes it possible to easily position the motor cover 80 without increasing the number of parts.

The embodiment of the present invention further employs the configuration in which: when the frame cover 20 is mounted onto the frame 10, the rib 84 pushes the frame cover 20 wider while housing the tip end portion 84a of the rib 84 into the recessed groove 22; and thereby, the rib 84 comes into close contact with the recessed groove 22, and the step 23 formed in the edge of the recessed groove 22 comes into engagement with the tip end portion of the rib 84. Thereby, the frame cover 20 in the state pushed wider by the rib 84 is fixed to the frame 10. This makes it possible to suppress vibrations caused by the operation of the electric motor 30, and to prevent the occurrence of rattling noises from the frame cover 20.

Moreover, the rib 84 is extendingly provided to the edge portion of the motor cover 80, which is located on the extension line from the driving shaft 30a of the electric motor 30, in a way that the rib 84 penetrates through the groove 16 from the housing chamber 12 side, and projects to the outside of the frame 10. This makes it possible to effectively suppress the force with which the electric motor 30 would be otherwise lifted from the motor bearing portion 14 because of the driving reaction force.

In addition, the rib 84 is extendingly provided to the edge portion of the motor cover 80 in contact with the side wall 15 of the frame 10. Thereby, the mere mounting of the frame cover 20 makes it possible to bring the step 23, constituting part of the recessed groove 22 of the frame cover 20, into engagement with the tip end portion 84a of the rib 84 while avoiding the control board 70.

The foregoing descriptions have been provided on the basis of the embodiment of the present invention. However, the present invention is not limited to this. The configuration of each component may be replaced with an arbitrary configuration which has the same function.

The entire content of Japanese Patent Application No. 2012-045254 (filed on Mar. 1, 2012) is herein incorporated by reference.

The invention claimed is:

1. An electric steering lock device, comprising:
   a frame having a shape of box with an opened surface and having a housing chamber formed inside the frame;
   a motor disposed inside the housing chamber, including a driving shaft, and configured to serve as a driving source;
   a worm gear fixed to the driving shaft of the motor;
   a worm wheel having a shape of disk, having a center shaft with one end pivotally supported by a bottom portion of the housing chamber, and disposed to be meshable with the worm gear;
   a motor cover configured to pivotally support the other end of the center shaft of the worm wheel and disposed inside the housing chamber while in contact with the motor; and
   a frame cover having a shape of box with an opened surface and mounted on the frame and sealing an opening of the housing chamber,
   wherein the motor cover includes an edge portion located outside an inner side surface of the frame cover with the motor cover being disposed inside the housing chamber, configured to push the frame cover wider when the frame cover is mounted onto the frame, and configured to be pressed by the frame cover from the opened surface of the frame with the frame cover being mounted on the frame.

2. The electric steering lock device according to claim 1, wherein
   the frame includes a side wall forming an opening edge of the frame and including a slit-shaped groove, and
   the edge portion of the motor cover includes a rib configured to penetrate through the slit-shaped groove from the housing chamber and project to an outside of the frame with the motor cover being installed inside the housing chamber, the rib being configured to push the frame cover wider when the frame cover is mounted onto the frame.

3. The electric steering lock device according to claim 2, wherein the frame cover includes a recessed groove in a region in an inner surface of the frame cover opposed to the rib, the recessed groove being capable of housing a tip end portion of the rib.

4. The electric steering lock device according to claim 3, wherein the rib and the slit-shaped groove are disposed on an extension line from the driving shaft of the motor with the motor cover being disposed inside the housing chamber.

5. The electric steering lock device according to claim 2, wherein the rib and the slit-shaped groove are disposed on an extension line from the driving shaft of the motor with the motor cover being disposed inside the housing chamber.

* * * * *